March 3, 1936. W. C. MULLER 2,032,430
HYDRAULIC POWER TRANSMITTING MECHANISM OR THE LIKE
Filed Oct. 7, 1930

Inventor:
Wolfgang C. Muller.
by Wright Brown Quinby May
attys.

Patented Mar. 3, 1936

2,032,430

UNITED STATES PATENT OFFICE 2,032,430

HYDRAULIC POWER TRANSMITTING MECHANISM OR THE LIKE

Wolfgang C. Muller, Springfield, Vt.

Application October 7, 1930, Serial No. 486,934

19 Claims. (Cl. 60—52)

This invention relates to fluid pressure systems from which there is unavoidable leakage and has for one object to compensate for this leakage. For example, in hydraulic power transmitting mechanisms comprising a motor driven by hydraulic pressure and means for producing such pressure there is always some leakage between the moving parts of the motor, and also of the pump by which the pressure is commonly produced and sometimes of other mechanism, which causes the motion of the motor to be somewhat slower than if no leakage were present, and because of the high pressure to which the liquid is commonly subjected in such systems, this leakage or "slip" may be substantial. Its amount is variable also, depending on the temperature of liquid since at higher temperatures its viscosity is lower so that leakage is greater than at lower temperatures where its viscosity is higher.

This invention provides compensation for this variable leakage thus to prevent uncontrolled variable motion of the motor for a given rate of pumping due to leakage and changes in the viscosity of the liquid.

Another object is to provide means for draining air from a closed hydraulic circuit.

Another object is to provide means for constantly replacing heated liquid by cooler liquid.

Further objects and advantages will appear from a more complete description of certain embodiments of this invention shown in the accompanying drawing in which Figure 1 is a diagrammatic view of a hydraulic power transmission apparatus illustrating one application of this invention.

Figure 1:
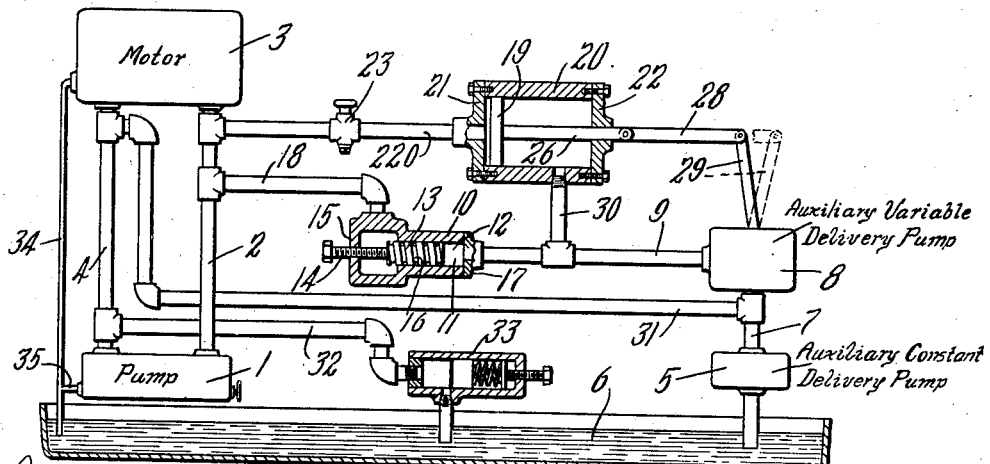

Referring to Figure 1, a main pump 1 delivers liquid under pressure through an intake pipe 2 to a hydraulic motor 3. The pump and motor may be of any desired type, as, for instance, rotary or cylinder and piston. The liquid returns from the motor 3 to the pump 1 through the discharge pipe 4 forms a closed circuit. At 5 is shown an auxiliary constant delivery pump which draws liquid from a tank 6 and delivers it through a pipe 7 to a variable delivery pump 8 in series with the pump 5. From the variable delivery pump, liquid passes through the pipe 9 to a valve 10, which is formed as an adjustable hydraulic resistance. It comprises a casing forming a chamber 11 having a cylindrical bore portion 12. In the portion 12 is slidably fitted a plunger 13 backed up by an adjusting screw 14 extending from the plunger 13 through a wall 15 of the casing and accessible externally thereof for adjustment to determine the adjusted position of the plunger 13 in the bore 12. This plunger 13 is provided with a helical groove 16 of a size to insure a viscous flow of the liquid, which may well be oil, in which case the groove may be about $\frac{1}{32}''$ in width and depth, the liquid passing through it in a similar way to the well known Saybolt viscosimeter. A cover plate 17 closes the bore 12 at one end and receives the pipe 9.

Liquid is led from the chamber 11, after passing through the groove 16, through a pipe 18 to the pump intake pipe 2.

At 19 is shown a differential piston slidably fitting in a cylinder 20 having oppositely disposed heads 21 and 22. The head 21 has an opening therethrough connected to a pipe 220 and a valve 23 to the intake or high pressure pipe 2. The valve 23 is merely a dampening throttle to the intake line to prevent rapid fluctuations of pressure therein from being transmitted to the cylinder 20. The other cylinder head 22 is provided with a bore to receive with a sliding fit a piston rod 26 extending from the piston 19. Outwardly of the cylinder this rod 26 is connected through a link 28 to a lever 29 which controls the delivery rate of the variable delivery pump 8 in such a manner that a movement of the piston 19 from left to right between its extreme limits of motion results in an increase in the rate of delivery of the pump 8 from its minimum to maximum values. A branch pipe 30 connects the cylinder 20 to the pipe 9 so that liquid from the right side of the piston 19 can always pass freely through it. Whatever liquid delivered by the constant delivery pump 5 does not pass through the variable delivery pump 8 goes through a pipe 31 and enters the low pressure or discharge pipe 4 close to the motor 3. Any excess liquid is relieved from the pipe 4 through the pipe 32 close to the main pump 1 and passes through the relief valve 33, which is set at a predetermined pressure slightly above atmospheric, back into the tank 6. Leakage past the moving parts of the motor and the main pump is conducted through the pipes 34 and 35 to the tank 6 at a point remote from the intake of the constant delivery auxiliary pump 5.

Due to the fact that the intake of the auxiliary pumps is remote from the point at which leakage from the hydraulic system is introduced into the tank 6, the liquid supplied by the auxiliary pumps both to the high and low pressure sides to the motor is of relatively cool liquid which has not recently been delivered from the system and it will also be noted that the liquid introduced by the auxiliary pumps into the discharge side of the motor is close to the motor, while the relief is close to the pump. This permits a thorough mixing of the liquid introduced with the liquid already in the circuit before relief is effected so that the warmer liquid heated by its circulation through the system is constantly being replaced by the cooler liquid in the tank. This acts not only to cool the liquid in the system, but also to remove from the system any air which may have been in the system. Also by maintaining pressure on the low pressure side of the system above atmospheric the opportunity for entrance of air into the system is reduced.

It is a proven fact that the leakage of liquid is approximately in proportion to the hydraulic pressure under which the device is operated and it is also known that the leakage varies inversely with the viscosity of the liquid. According to the construction in Figure 1, therefore, liquid is delivered into the high pressure intake line to the motor equal to the amount lost by leakage. This requires that more liquid be delivered into this line when the mechanism is operating under high pressure than when operating under a low pressure. It also requires that when the viscosity of the liquid decreases, as when it heats up in operation, more liquid be delivered into the high pressure line to make up for the increased leakage. It will be noted that the effective areas of the piston 19 on opposite sides are different, owing to the fact that the rod 26 reduces the effective area for fluid pressure on the right hand side of the piston. Assuming that the ratio between the left side area and the right side area of this piston is 11 to 10, there has to be a proportion of pressures on the left and right hand side of the piston of 10 to 11 to maintain a balanced condition. This condition exists only when the pressure in the pipes 9 and 30 is 10% higher than the pressure in the pipe 2 and under such conditions there is therefore a flow of liquid through the groove 16 in the resistance valve 10 to the motor intake pipe. The pressure difference in the pipes 9 and 16 is thus proportional to the absolute pressure prevailing in the pipe 2. The flow through the valve 10 will therefore be proportional to the pressure in the pipe 2 and will, being always viscous, in amount be inversely proportional to the viscosity of the liquid.

Assuming, for example, that the pressure in the pipe 2 is 100 pounds absolute, the pressure in the pipe 9 will therefore be 110 pounds absolute, due to the controlling action of the piston 19. The flow through the valve 10 is then determined by a pressure difference of 10 pounds on opposite sides. If now the motor encounters a resistance which causes the pressure in the pipe 2 to be raised to a 1000 pounds, liquid enters through the pipe 2 against the left side of the piston 19 and causes it to be moved to the right since there is only 110 pounds pressure on that side. This movement causes an increase in the delivery of the variable delivery pump 8 until this delivery is increased to such a point that balanced condition is reached, which requires a pressure of 1100 pounds absolute on the right hand side of the piston 19. The flow through the valve 10 is now determined by a pressure difference of 100 pounds. The leakage in the circuit has increased 10 times due to the pressure raise from 100 pounds to 1000 pounds and so has the flow through the valve 10, which compensates for this leakage. The motor, therefore, will move with a constant speed under any load to which it may be subjected. A change in viscosity of the oil will be compensated for by the action of the valve 10, which permits more liquid to flow therethrough as the viscosity becomes lower, compensating for the increased leakage in the system due to the same lowering of viscosity. This is accomplished without any change in pressure difference on the left and right sides of the piston 19 which will have to be maintained in constant ratio to cause the piston to be in balanced condition. The position of the plunger 13 must be adjusted in accordance with the leakage of the particular hydraulic system. If this leakage is larger the plunger should be moved to the left, and if smaller to the right by manipulation of the screw 14.

Figure 2:
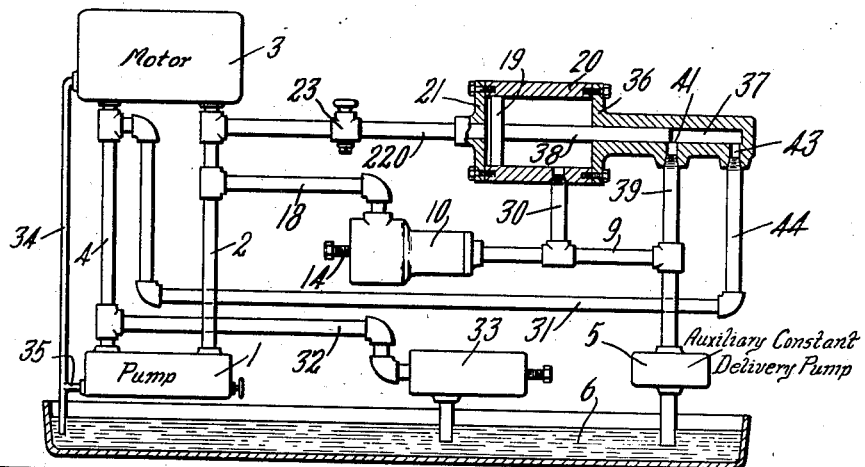
Figure 2 is a similar view illustrating a modification.

In Figure 2 a somewhat modified construction is shown. The constant delivery auxiliary pump 5 in this form delivers fluid directly into the pipe 9. The cylinder 20 containing the differential piston 19 is provided at one end with a head 36 provided with a bore 37 which slidingly receives the end of the piston rod 38 of the piston 19, which acts as a valve to control the opening of a port 41. Any liquid delivered by the constant delivery pump 5 which does not pass through the hydraulic resistance valve 10 goes through the branch pipe 39 and the port 41 into the bore 37 beyond the end of the piston rod 38 from which it escapes at its outer end through the port 43 and the pipe 44 into the discharge pipe 4 from the motor 3. The remaining parts of the system are the same as in Figure 1.

The movement of the piston 19 regulates the by-pass of the constant delivery pump 5 through the port 41, the outer end of the piston rod 38 acting as a valve therefor, this by-pass escaping to the discharge pipe of the motor in the same way that the excess from the pump 5 in Figure 1 not passing through the pump 8 escapes to the motor discharge pipe. An increase in pressure in the high pressure intake pipe 2 moves the piston 19 to the right, shuts off the by-pass of the pump 5 and increases the pressure in the pipe 9, thus forcing the necessary amount of liquid through the valve 10 into the high pressure line, the viscosity of this liquid being compensated for in the same way as explained with reference to Figure 1. The desired ratio of pressure differences having been established, the by-pass again opens and the conditions are maintained in equilibrium.

Figure 3:
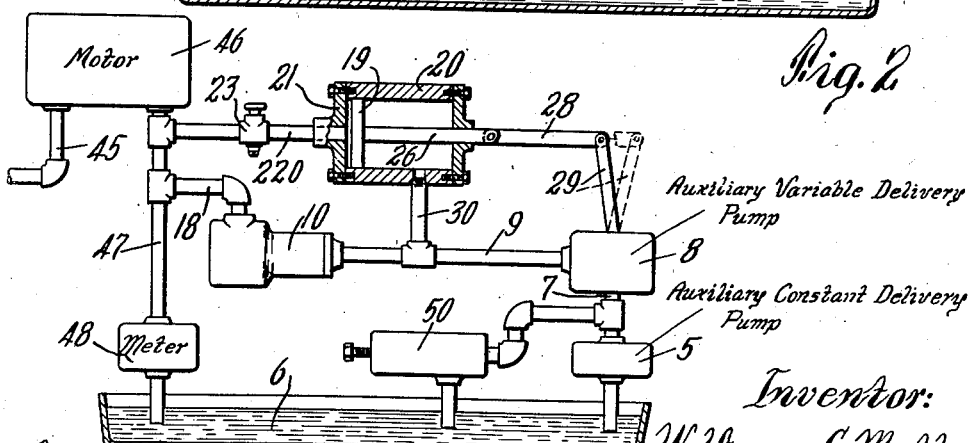
Figure 3 is a view somewhat similar to a portion of Figure 1, but showing the use of a liquid metering device for regulating the motor speed.

In Figure 3 is shown mechanism in which the motor 46 discharges through a meter 48 in the discharge pipe 47. The motor is supplied with fluid under substantially constant pressure from any suitable source through the intake pipe 45. The discharge after passing through the meter goes to the tank 6. In this arrangement the discharge pipe 47 is connected to the cylinder 20 in place of the intake pipe being so connected. This system also includes the constant delivery auxiliary pump 5, a variable delivery auxiliary pump 8 in series with the pump 5, and controlled by the differential piston 19, and a pipe 9 receiving the discharge from the variable delivery pump and delivering it through the variable resistance valve 10 to the pipe 47. The pipe 9 is connected to the right hand side of the differential piston 19 through the pipe 30, but the discharge from between the auxiliary pump 5 and 8 instead of passing to one side of the motor, leads directly through the relief valve 50 back to the tank 6. In this arrangement while fluid under constant pressure is delivered through the pipe 45, the pressure in the pipe 47 is nearly equal to that in the pipe 45 with no load on the motor 46. As the load on the motor increases, the pressure in the pipe line 47 decreases. With increasing motor load, therefore, the leakage in the meter decreases and the leakage in the motor increases, both tending to slow down the motor. With the connection shown the maximum amount of liquid will be supplied from the auxiliary pumps to the system if there is high pressure in the pipe line 47, which means small load on the motor. The supply from the auxiliary pumps will decrease with increasing load on the motor and thus speed up the motor at the same rate as the leakage tends to slow down the motor, the valve 10 compensating automatically for variations in viscosity of the liquid in a direction to compensate for leakage variations in the system due to the same cause.

From the foregoing description of certain embodiments of this invention, it should be evident to those skilled in the art that various changes and modifications might be made without departing from the spirit or scope of this invention as defined by the appended claims.

I claim:

1. A mechanism of the class described comprising a fluid pressure motor having supply and exhaust passages, a main pump for supplying fluid under pressure through said supply passage to said motor, an auxiliary fluid pressure pump, and means for delivering fluid from said auxiliary pump to one of said passages at a pressure exceeding that in said one passage by an amount proportional thereto.

2. A mechanism of the class described comprising a liquid pressure motor having supply and exhaust passages, means for supplying liquid under pressure through said supply passage to said motor, a liquid pressure pump, and means for delivering liquid from said pump to one of said passages at a pressure exceeding that in said one passage by an amount proportional thereto and at a rate inversely proportional to the viscosity of said liquid.

3. A mechanism of the class described comprising a fluid pressure motor, a main fluid pressure pump for delivering fluid under pressure to said motor, an auxiliary fluid pressure pump, and means for delivering fluid from said auxiliary pump to said motor at a pressure exceeding that delivered by said main pump by an amount protional to that delivered by said main pump.

4. A mechanism of the class described comprising a hydraulic motor having intake and discharge pipes, a hydraulic pump for delivering liquid under pressure to said motor intake and for receiving the discharge from said discharge pipe, an auxiliary hydraulic pump means for delivering liquid to said intake, and means for regulating the pressure of liquid supplied by said auxiliary pump means in excess of that in said intake by an amount proportional to said intake pressure.

5. A mechanism of the class described comprising a hydraulic motor having intake and discharge pipes, a hydraulic pump for delivering liquid under pressure to said motor intake and for receiving the discharge from said discharge pipe, an auxiliary hydraulic pump means for delivering liquid to said intake, means for regulating the pressure of liquid supplied by said auxiliary pump means in excess of that in said intake by an amount proportional to said intake pressure, and means for regulating the rate of flow from said auxiliary pump means in inverse proportion to the viscosity of the liquid.

6. A mechanism of the class described comprising a hydraulic motor having intake and discharge pipes, a hydraulic pump for delivering liquid under pressure to said motor intake and for receiving the discharge from said discharge pipe, an auxiliary hydraulic pump means for delivering liquid to said intake, means for regulating the pressure of liquid supplied by said auxiliary pump means in excess of that in said intake by an amount proportional to said intake pressure, means for delivering liquid under pressure from said auxiliary pump means to said discharge pipe adjacent to said motor, and means for relieving liquid from said discharge pipe adjacent to said pump under predetermined pressure.

7. A mechanism of the class described comprising a hydraulic motor having intake and discharge pipes, a hydraulic pump for supplying liquid under pressure to said intake pipe, an auxiliary hydraulic pump means, a differential piston subject to pressure in one of said pipes and to the delivery pressure of said auxiliary pump means on opposite sides, means controlled by said piston for regulating the delivery pressure from said auxiliary pump means to an amount in excess of that in said intake pipe by a predetermined proportion, and resistance means inversely proportional to the viscosity of the liquid connecting the delivery from said auxiliary pump means to said intake pipe.

8. A mechanism of the class described comprising a hydraulic motor having intake and discharge pipes, a pump for supplying liquid under pressure to said intake pipe, an auxiliary constant delivery pump, an auxiliary variable delivery pump in series with said constant delivery pump for delivering liquid to said intake pipe, means responsive to the pressure in said intake for controlling said variable delivery pump to deliver at a higher pressure than in said intake by a predetermined proportion of said intake pressure, means for conducting excess liquid from between said auxiliary pumps to said discharge pipe, and means for relieving liquid from said discharge pipe at a predetermined pressure.

9. A mechanism of the class described comprising a hydraulic motor having intake and discharge pipes, a pump for supplying liquid under pressure to said intake pipe and for taking liquid from said discharge pipe, an auxiliary constant delivery pump, an auxiliary variable delivery pump in series with said constant delivery pump for delivering liquid to said intake pipe, means responsive to the pressure in said intake for controlling said variable delivery pump to deliver at a higher pressure than in said intake by a predetermined proportion of said intake pressure, means for conducting excess liquid from between said auxiliary pumps to said discharge pipe adjacent to said motor, and means for relieving liquid from said discharge pipe adjacent to said supply pump at a predetermined pressure above atmospheric.

10. A mechanism of the class described comprising a motor having intake and discharge pipes, a pump for delivering liquid under pressure to said intake pipe and for taking liquid from said discharge pipe, an auxiliary constant delivery pump, means for conducting a portion of the delivery from said auxiliary pump at a pressure a predetermined proportion above said intake pressure to said intake pipe and the remainder of said auxiliary pump delivery to said motor discharge pipe, and means for relieving liquid from said discharge pipe at a predetermined pressure.

11. A mechanism of the class described comprising a motor having intake and discharge pipes, a pump for delivering liquid under pressure to said intake pipe and for taking liquid from said discharge pipe, an auxiliary constant delivery pump, means including a resistance to liquid flow inversely proportional to the viscosity of the liquid for conducting a portion of the delivery from said auxiliary pump at a pressure a predetermined proportion above said intake pressure to said intake pipe and the remainder of said auxiliary pump delivery to said motor discharge pipe, and means for relieving liquid from said discharge pipe at a predetermined pressure.

12. A mechanism of the class described comprising a hydraulic motor having intake and discharge pipes, a pump for taking liquid from said discharge pipe and delivering it under pressure to said intake pipe, an auxiliary pump, a differential piston responsive to liquid pressures in said intake pipe and of the delivery from said auxiliary pump, connections from said auxiliary pump to said intake and discharge pipes, and a valve for controlling said connections actuated by said piston to deliver liquid under a pressure to said intake pipe a predetermined proportion higher than said intake pressure and the remainder of the delivery from said auxiliary pump to said discharge pipe, and means for relieving liquid from said discharge pipe at a predetermined pressure.

13. A mechanism of the class described comprising a hydraulic motor having a discharge pipe, means for supplying liquid under constant pressure to said motor to drive said motor and then to pass through said discharge pipe, a fluid meter in said discharge pipe for regulating the speed of said motor, and means for introducing fluid into said discharge pipe between said motor and meter at a pressure higher than the pressure in said discharge pipe by a definite proportion of said discharge pipe pressure.

14. A mechanism of the class described comprising a hydraulic motor having a discharge pipe, means for supplying liquid under constant pressure to said motor to drive said motor and then to pass through said discharge pipe, a fluid meter in said discharge pipe for regulating the speed of said motor, and means for introducing fluid into said discharge pipe between said motor and meter at a pressure higher than the pressure in said discharge pipe by a definite proportion of said discharge pipe pressure, said introducing means including a resistance to liquid flow inversely proportional to the viscosity of the liquid.

15. A mechanism of the class described comprising a hydraulic motor having a discharge pipe, means for supplying liquid under constant pressure to said motor to drive said motor and then to pass through said discharge pipe, a fluid meter in said discharge pipe for regulating the speed of said motor, an auxiliary pump, a differential piston responsive to the delivery pressure of said auxiliary pump and to the pressure in said discharge pipe, and means controlled by said piston for conducting liquid from said auxiliary pump delivery to said discharge pipe between said motor and meter at a pressure higher than in said discharge pipe by a predetermined ratio thereto.

16. A mechanism of the class described comprising a hydraulic motor having a discharge pipe, means for supplying liquid under constant pressure to said motor to drive said motor and then to pass through said discharge pipe, a fluid meter in said discharge pipe for regulating the speed of said motor, an auxiliary pump, a differential piston responsive to the delivery pressure of said auxiliary pump and to the pressure in said discharge pipe, and means controlled by said piston for conducting liquid from said auxiliary pump delivery to said discharge pipe between said motor and meter at a pressure higher than in said discharge pipe by a predetermined ratio thereto, said conducting means including a resistance to liquid flow inversely proportional to the viscosity of the liquid.

17. A mechanism of the class described comprising a hydraulic motor having an intake pipe supplied with liquid at substantially constant pressure and a discharge pipe, a hydraulic meter interposed in said discharge pipe, an auxiliary constant delivery hydraulic pump, a variable delivery pump in series with said auxiliary pump, means responsive to the pressure in said discharge pipe to control the delivery of said variable delivery pump to produce a delivery pressure above that in said discharge pipe by a predetermined proportion, pipe connections from the delivery of said variable delivery pump to said discharge pipe, and means to relieve liquid between said auxiliary and variable delivery pumps at a predetermined low pressure.

18. A mechanism of the class described comprising a hydraulic motor having an intake pipe supplied with liquid at substantially constant pressure and a discharge pipe, a hydraulic meter interposed in said discharge pipe, an auxiliary constant delivery hydraulic pump, a variable delivery pump in series with said auxiliary pump, means responsive to the pressure in said discharge pipe to control the delivery of said variable delivery pump at a pressure above that in said discharge pipe by a predetermined proportion, pipe connections from the delivery of said variable delivery pump to said discharge pipe including a resistance inversely proportional to the viscosity of the liquid, and means to relieve liquid between said auxiliary and variable delivery pumps at a predetermined low pressure.

19. A mechanism of the class described, comprising a fluid pressure motor having a supply passage for receiving liquid under pressure and an exhaust passage, means for supplying liquid under pressure to said supply passage, a source of liquid under pressure, means maintaining liquid in said source at a pressure exceeding that in one of said passages by an amount proportional to the pressure in said passage, and a connection means inversely responsive in rate of liquid flow therethrough to the viscosity of said liquid between said source and said one passage.

WOLFGANG C. MULLER.